United States Patent

Sayles et al.

[11] Patent Number: 5,842,658
[45] Date of Patent: Dec. 1, 1998

[54] SEAT BELT RETRACTOR WITH DEFLECTION ALARM

[75] Inventors: Robert D. Sayles, Rochester; Lawrence J. Verellen, Washington, both of Mich.

[73] Assignee: TRW Vehicle Safety Systems Inc., Lyndhurst, Ohio

[21] Appl. No.: 899,039

[22] Filed: Jul. 23, 1997

[51] Int. Cl.⁶ .................................................. B60R 22/28
[52] U.S. Cl. ...................................... 242/379.1; 116/67 R
[58] Field of Search .................. 242/379.1; 280/805, 280/806; 297/470, 471, 472, 478; 116/28 R, 67 R

[56] References Cited

U.S. PATENT DOCUMENTS 4,322,046  3/1982  Tanaka et al. .
5,558,295  9/1996  Bauer .
5,660,347  8/1997  Baker ................................ 242/379.1

Primary Examiner—John M. Jillions
Attorney, Agent, or Firm—Tarolli, Sundheim, Covell, Tummino & Szabo

[57] ABSTRACT

An apparatus comprises a rotatable structure (40) having an axis of rotation (41). The rotatable structure (40) includes a spool (16), a ratchet wheel (44), and a deflectable part (42) which deflects upon rotation of the spool (16) about the axis (41) relative to the ratchet wheel (44). An alarm apparatus (60) responds to deflection of the deflectable part (42) by providing an audible alarm upon subsequent rotation of the rotatable structure (40).

8 Claims, 5 Drawing Sheets

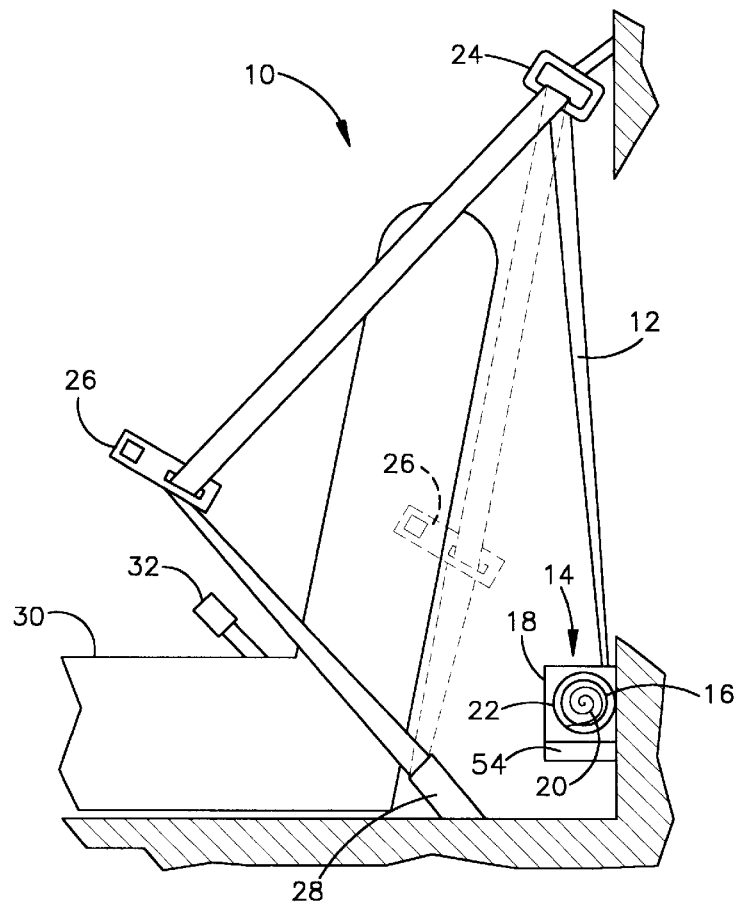
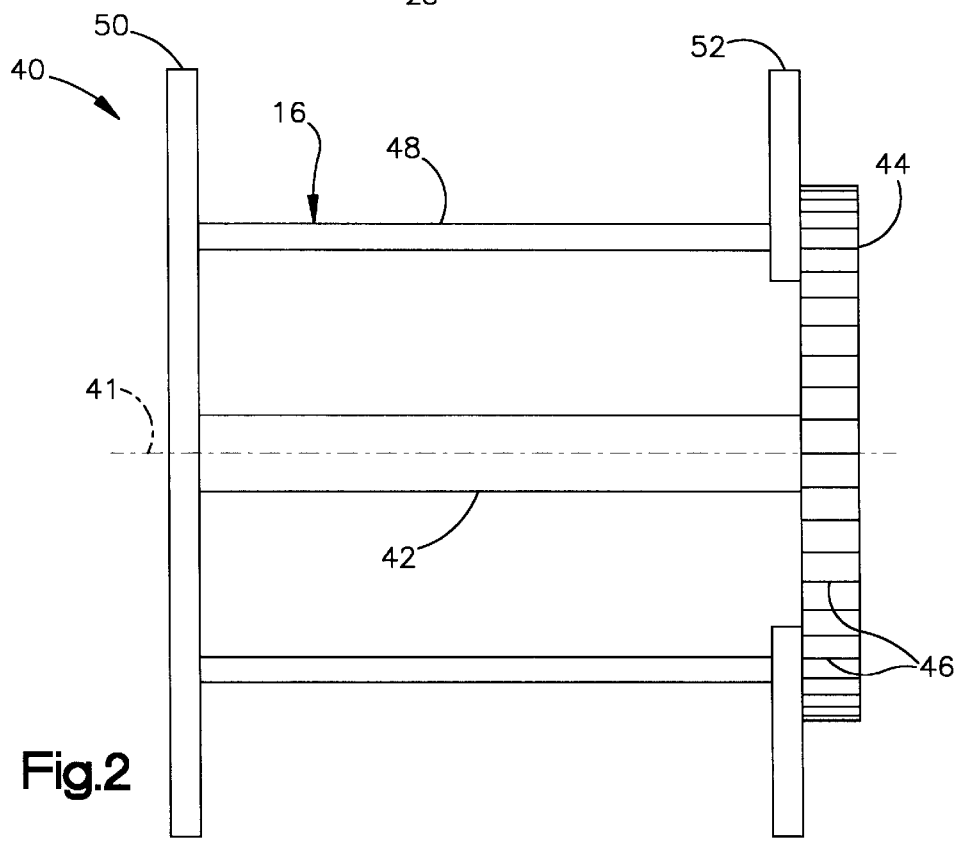
Fig.1
Fig.2

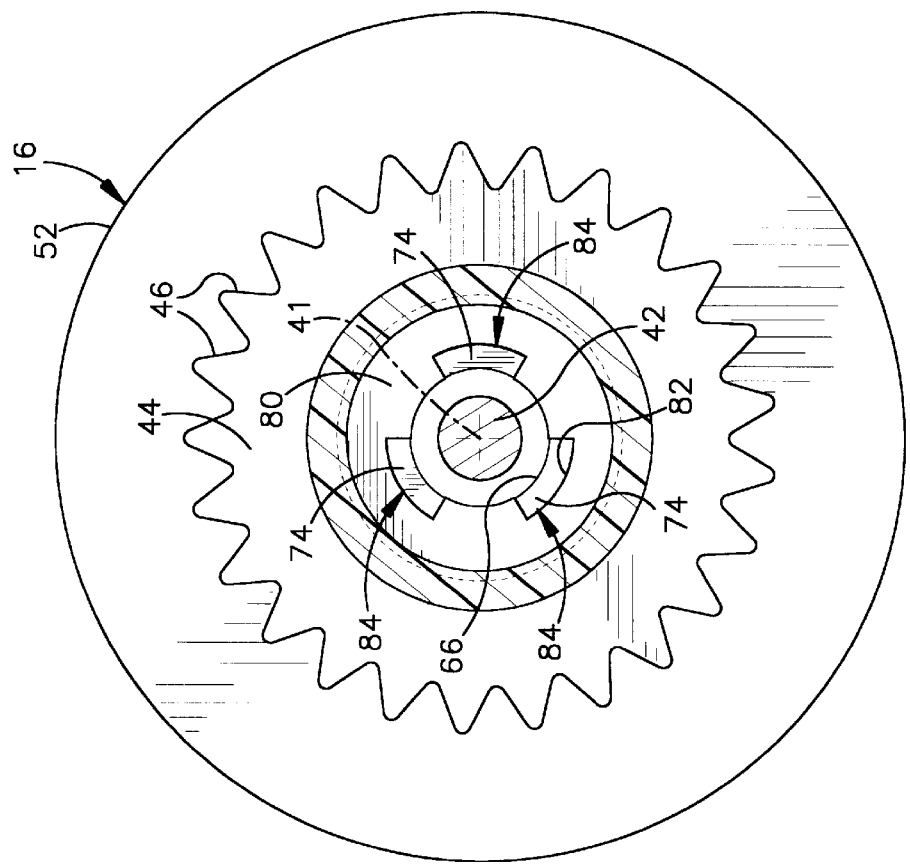
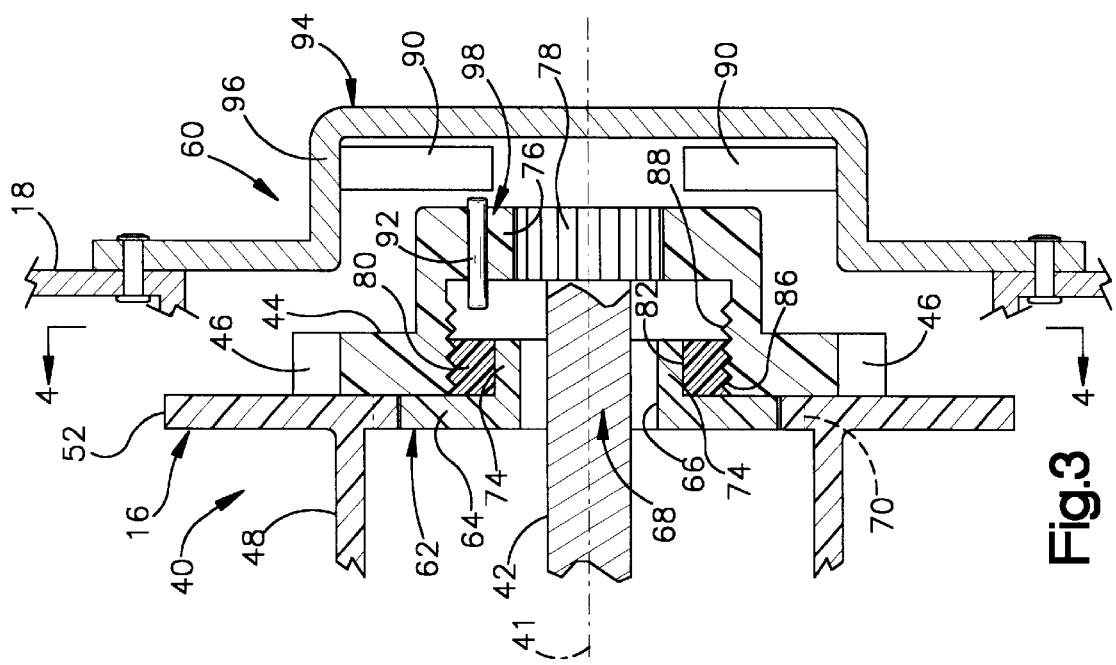

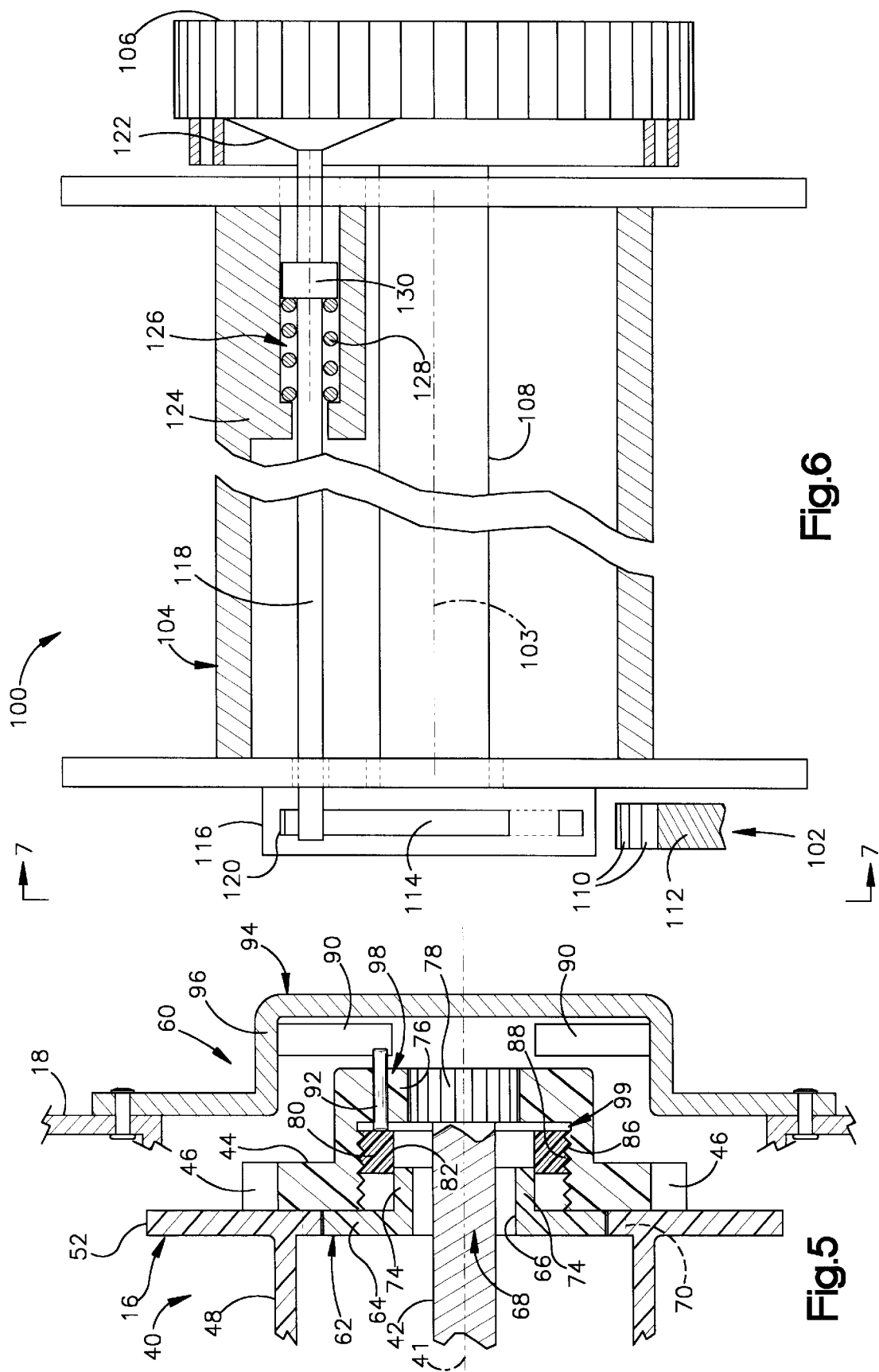

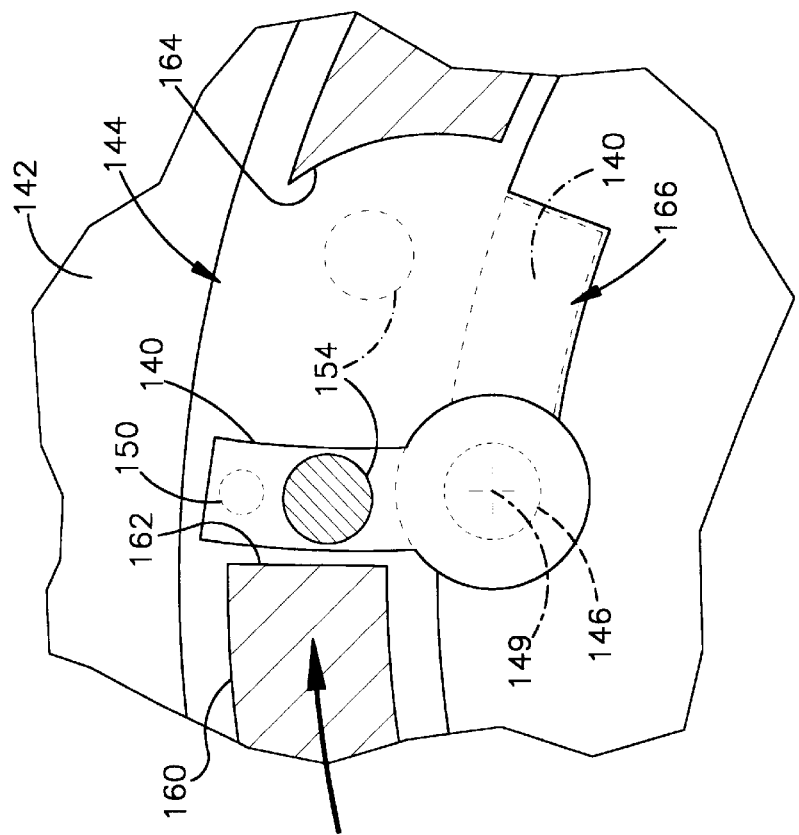
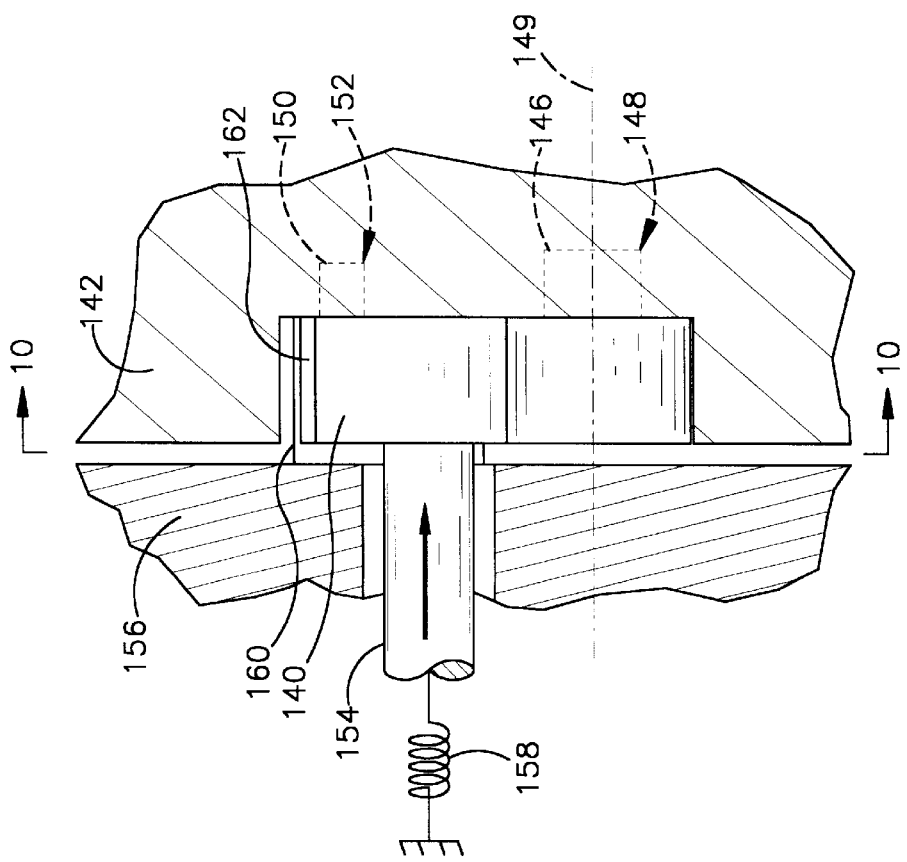

SEAT BELT RETRACTOR WITH DEFLECTION ALARM

FIELD OF THE INVENTION

The present invention relates to a retractor for seat belt webbing, and particularly relates to a retractor with a deflectable part which dissipates energy from the webbing during a vehicle crash.

BACKGROUND OF THE INVENTION

A seat belt system for restraining an occupant of a vehicle ordinarily includes seat belt webbing, a seat belt buckle, and a seat belt retractor. A locking tongue is connected to the webbing and is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

When the vehicle experiences a crash, the vehicle decelerates and the vehicle occupant wearing the seat belt webbing moves forward against the webbing. The force which is then applied to the webbing urges the webbing to move outward from the retractor. However, an emergency locking mechanism in the retractor blocks unwinding rotation of the spool in response to sudden vehicle deceleration and/or sudden extracting movement of the webbing. The emergency locking mechanism thus prevents the webbing from moving outward from the retractor when the vehicle experiences a crash. The webbing then restrains forward movement of the vehicle occupant.

In a high energy crash, the webbing may apply correspondingly high restraining forces to the occupant. This may result from factors such as the weight and position of the occupant as well as the energy of the crash. Therefore, a retractor may include a deflectable part, such as a torsion bar, which dissipates energy from the webbing by deflecting during a crash.

SUMMARY OF THE INVENTION

In accordance with the present invention, an apparatus comprises a rotatable structure having an axis of rotation. The rotatable structure includes a spool, a ratchet wheel and a deflectable part. The deflectable part deflects upon rotation of the spool about the axis relative to the ratchet wheel. An alarm apparatus responds to deflection of the deflectable part by providing an audible alarm upon subsequent rotation of the rotatable structure.

In the preferred embodiments of the present invention, the deflectable part of the rotatable structure is a torsion bar centered on the axis of rotation. The alarm apparatus has a plurality of first noisemaker parts which are spaced apart circumferentially about the axis. A second noisemaker part strikes the first noisemaker parts audibly in succession when the rotatable structure rotates after the torsion bar has been twisted a predetermined amount.

In one of the preferred embodiments of the invention, the first noisemaker parts are flexible plastic tabs. The second noisemaker part is a rigid pin supported on the ratchet wheel. The pin is moved axially beside the tabs upon twisting of the torsion bar. The pin is then moved circumferentially against the tabs successively around the axis upon subsequent rotation of the ratchet wheel.

In second and third embodiments of the invention, the second noisemaker part is a leaf spring mounted on the spool. A movable rod releasably engages and holds the leaf spring in an unactuated position. When the leaf spring is in the unactuated position, a free end of the leaf spring is spaced radially inward from the first noisemaker parts. An additional spring moves the rod out of engagement with the leaf spring upon twisting of the torsion bar. The leaf spring then flexes radially outward to an actuated position in which its free end strikes the first noisemaker parts upon subsequent rotation of the spool.

In the second embodiment, the additional spring urges the rod to slide down a ramp surface on the ratchet wheel, and thereby to move longitudinally out of engagement with the leaf spring, upon twisting of the torsion bar. In the third embodiment, the ratchet wheel supports a pivotal blocking arm which blocks the rod from moving out of engagement with the leaf spring. The spool moves the blocking arm pivotally away from the rod upon twisting of the torsion bar. The additional spring then moves the rod longitudinally out of engagement with the leaf spring to release the leaf spring for movement to its actuated position.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant restraint apparatus comprising a first embodiment of the present invention;

FIG. 2 is a schematic view of parts of the apparatus of FIG. 1;

FIG. 3 is an enlarged partial view of parts of the apparatus of FIG. 1;

FIG. 4 is a view taken on line 4—4 of FIG. 3;

FIG. 5 is a view similar to FIG. 3 showing parts in different positions;

FIG. 6 is a schematic view of parts of an apparatus comprising a second embodiment of the present invention;

FIG. 9 is a schematic view of parts of an apparatus comprising a third embodiment of the present invention; and FIG. 10 is a view taken on line 10—10 of FIG. 9.

DESCRIPTION OF THE PREFERRED EMBODIMENTS

Figure 7:
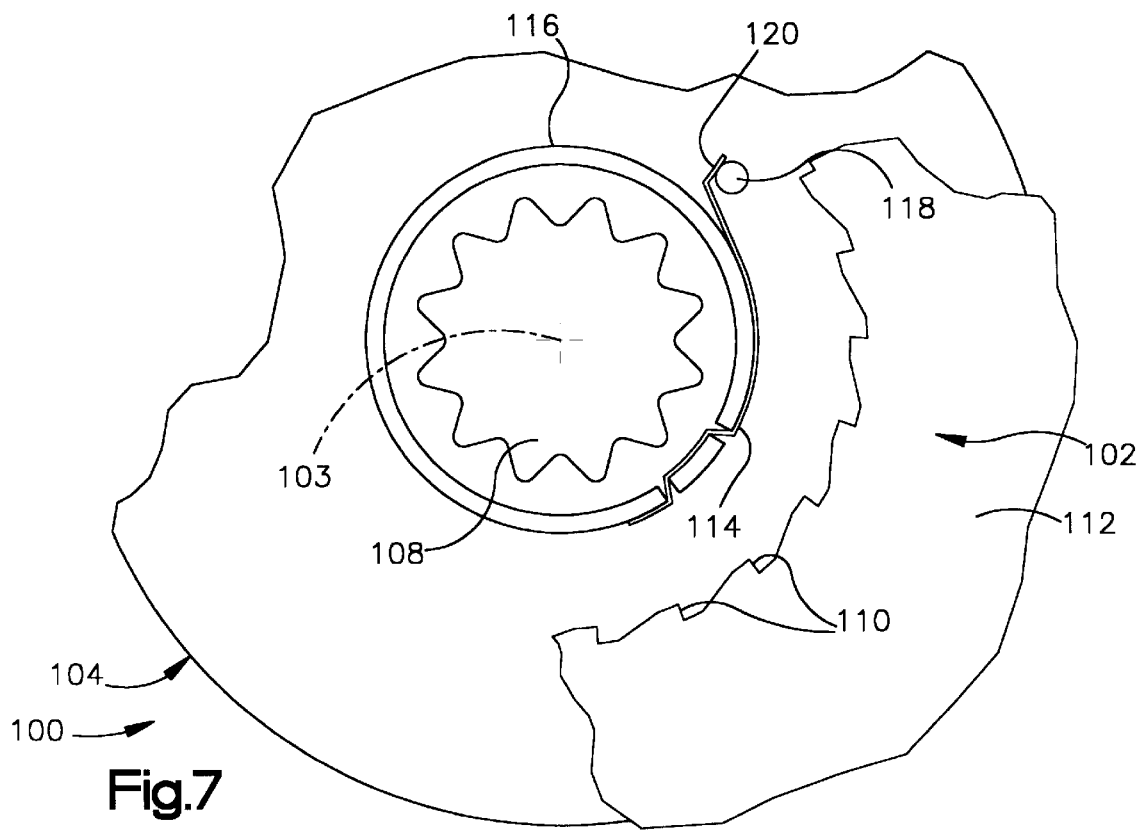
FIG. 7 is a view taken on line 7—7 of FIG. 6.

A vehicle occupant restraint apparatus 10 comprising a first embodiment of the present invention is shown schematically in FIG. 1. The apparatus 10 is a seat belt system including seat belt webbing 12 and a seat belt retractor 14 for the webbing 12. The retractor 14 includes a spool 16 to which the webbing 12 is connected, and a frame 18 upon which the spool 16 is supported for rotation. A rewind spring 20 acts between the spool 16 and a spring cover 22 on the frame 18 so as to bias the spool 16 to rotate in a winding direction. The seat belt system 10 further includes a D-ring 24, a locking tongue 26 and an anchor 28. The webbing 12 extends from the retractor 14 to the anchor 28 through the D-ring 24 and the tongue 26.

The webbing 12 is movable back and forth between a fully retracted position and a fully extracted position upon winding of the webbing 12 on the spool 16 in the retractor 14 and unwinding of the webbing 12 from the spool 16. When the webbing 12 is in the fully retracted position, it is fully wound onto the spool 16, and a portion of the webbing 12 is located on one side of an associated vehicle seat 30, as shown in dashed lines in FIG. 1. When the webbing 12 is in the fully extracted position, it is fully unwound from the spool 16, and is extracted from the retractor 14 sufficiently to enable the tongue 26 to reach a buckle 32 at the other side of the seat 30. The rewind spring 20 is stressed as the spool 16 rotates in an unwinding direction when a vehicle occupant extracts the webbing 12 from the retractor 14 and moves the tongue 26 toward the buckle 32. When the vehicle occupant releases the tongue 26 from the buckle 32, the rewind spring 20 rotates the spool 16 in the winding direction to retract the webbing 12 into the retractor 14, and thereby to move the webbing 12 back to the fully retracted position.

As shown schematically in FIG. 2, the spool 16 is part of a rotatable structure 40 with an axis of rotation 41. Other parts of the rotatable structure 40 include a torsion bar 42 which is centered on the axis 41, and a ratchet wheel 44 with ratchet teeth 46. The spool 16 has a cylindrical core 48 extending axially between a pair of circular end walls 50 and 52. The webbing 12 (FIG. 1) is wound around the core 48, and is connected to the core 48 in a known manner. For example, an end portion of the webbing 12 can be received through a slot (not shown) in the core 48 and sewn in a loop around the torsion bar 42. The torsion bar 42 extends axially between, and is fixed to, the first end wall 50 and the ratchet wheel 44. In this arrangement, the spool 16, the torsion bar 42 and the ratchet wheel 44 are rotatable together about the axis 41. The spool 16 is rotatable about the axis 41 relative to the ratchet wheel 44 upon twisting of the torsion bar 42 along its length between the first end wall 50 and the ratchet wheel 44.

As further shown schematically in FIG. 1, the retractor 14 has an emergency locking mechanism 54. The emergency locking mechanism 54 may comprise any suitable structure known in the art, and operates in a known manner to block extraction of the webbing 12 from the spool 16 in response to one or more vehicle conditions that indicate the occurrence of a crash. Such crash-indicating conditions may comprise, for example, a predetermined amount of vehicle deceleration and a predetermined amount of sudden unwinding rotation of the spool 16. The retractor 14 may also have an automatic locking mechanism which, as known in the art, operates to block extraction of the webbing 12 automatically when the webbing is fastened about a vehicle occupant.

The emergency locking mechanism 54 senses and responds to the crash-indication conditions) by moving a locking pawl into engagement with the ratchet teeth 46 so as to block unwinding rotation of the ratchet wheel 44, and thereby to block unwinding rotation of the spool 16. This prevents further extraction of the webbing 12 from the spool 16 upon the occurrence of a crash. The webbing 12 can then restrain forward movement of an occupant of the seat 30 when the vehicle decelerates during the crash.

Forward movement of the occupant against the webbing 12 causes the webbing 12 to restrain the occupant with a restraining force that is directly related to the kinetic energy of the occupant. The restraining force is transmitted from the webbing 12 to the torsion bar 42 (FIG. 2) by the core 48 and the first end wall 50 of the spool 16. The restraining force is thus applied as torque which causes the torsion bar 42 to twist along its length between the first end wall 50 and the ratchet wheel 44. The spool 16 simultaneously rotates an amount in the unwinding direction relative to the ratchet wheel 44. This enables the webbing 12 and the vehicle occupant to move a corresponding amount forward against the resistance of the twisting torsion bar 42. The torsion bar 42 thus dissipates energy transferred from the occupant to the webbing 12 to ease the restraining force acting upon the occupant.

As shown in FIG. 3, the retractor 14 further includes an alarm apparatus 60. The alarm apparatus 60 responds to the occurrence of a predetermined amount of twisting of the torsion bar 42 by providing an audible alarm upon subsequent rotation of the ratchet wheel 44. The alarm indicates to a person using the seat belt system 10 that the system 10 has been subjected to the forces of a vehicle crash.

In the first embodiment of the present invention, the alarm apparatus 60 includes a rotatable driving wheel 62. The driving wheel 62 is mounted coaxially on the second end wall 52 of the spool 16. A disk-shaped base portion 64 of the driving wheel 62 has an annular inner edge surface 66 defining a central opening 68. A plurality of splines 70 at the outer periphery of the driving wheel 62 constrain the driving wheel 62 to rotate about the axis 41 with the spool 16. A plurality of arm portions 74 of the driving wheel 62 project axially outward (to the right as viewed in FIG. 3) from the base portion 64 at locations that are spaced apart circumferentially about the central opening 68.

The torsion bar 42 extends axially outward through the central opening 68 past the driving wheel 62 and the end wall 52 of the spool 16. The torsion bar 42 further extends into an annular hub 76 on the ratchet wheel 44. Splines 78 on the torsion bar 42 engage the hub 76 to establish a rotatably fixed connection of the torsion bar 42 with the ratchet wheel 44.

A driven wheel 80 is mounted concentrically on the driving wheel 62. As best shown in FIG. 4, the driven wheel 80 is a ring-shaped part with an inner peripheral surface 82 defining a plurality of circumferentially spaced grooves 84. Each arm 74 of the driving wheel 62 is received in a corresponding groove 84 in the driven wheel 80. The arms 74 and the surface 82 establish a rotatable driving connection between the driving wheel 62 and the driven wheel 80.

The driven wheel 80 has an external screw thread 86 (FIG. 3) engaged with an internal screw thread 88 on the ratchet wheel 44. When the driven wheel 80 rotates with the driving wheel 62 and the spool 16 relative to the ratchet wheel 44, the screw thread 88 imparts axially outward movement to the driven wheel 80. The driven wheel 80 then slides axially outward over the arm portions 74 of the driving wheel 62 from the position of FIG. 3 toward the position of FIG. 5.

The alarm apparatus 60 further has a plurality of noise-maker parts for providing the audible alarm. These include first noisemaker parts 90 and a second noisemaker part 92. The first noisemaker parts 90 are thin, flexible portions of a plastic frame cover 94. More specifically, the first noise-maker parts 90 are tabs which project radially inward from a cylindrical wall portion 96 of the frame cover 94 at locations that are spaced apart circumferentially about the axis 41. The second noisemaker part 92 is a rigid pin extending longitudinally through a passage 98 in the hub 76 of the ratchet wheel 44. The pin 92 is movable longitudinally outward in the passage 98 from an unactuated position spaced axially from tabs 90, as shown in FIG. 3, to an actuated position reaching axially beside the tabs 90, as shown in FIG. 5. The pin 92 is normally held in the unactuated position by an interference fit with the hub 76.

When the torsion bar 42 twists under the influence of the restraining force of the webbing 12, the spool 16 and the driving wheel 62 rotate together relative to the ratchet wheel 44. This causes the driven wheel 80 to move axially outward toward the pin 92, as described above. The driven wheel 80 moves against and pushes the pin 92 axially outward to the actuated position of FIG. 5 upon a predetermined amount of twisting of the torsion bar 42. When the rotatable structure 40 (including the spool 16, the torsion bar 42 and the ratchet wheel 44) subsequently rotates upon further extraction and retraction of the webbing 12, the ratchet wheel 44 moves the pin 92 circumferentially around the axis 41. The pin 92 then strikes the tabs 90 audibly in succession around the axis 41 so as to provide an alarm which indicates to a vehicle occupant that the seat belt system 10 has been subjected to the forces of a vehicle crash.

In accordance with a particular feature of the present invention, the hub 76 of the ratchet wheel 44 functions as a stop member which limits the amount of axially outward movement of the driven wheel 80, and which thereby limits the amount of twisting of the torsion bar 42. The pin 92 is thus moved to the actuated position upon a predetermined amount of twisting of the torsion bar which is less than the maximum amount permitted by the hub 76. This is indicated in FIG. 5 by the small gap 99 remaining between the driven wheel 80 and the hub 76. Moreover, the maximum amount of twisting, i.e., strain in the torsion bar 42, that is permitted by the hub 76 is less than the elastic limit of such strain. This helps to ensure that the torsion bar 42 will not break.

In a second embodiment of the present invention, a seat belt system includes an alternative rotatable structure 100 (FIG. 6) with an alternative alarm apparatus 102 in place of the rotatable structure 40 and the alarm apparatus 60 described above.

The rotatable structure 100 has an axis of rotation 103, and includes a spool 104, a ratchet wheel 106, and a torsion bar 108 interconnecting the spool 104 and the ratchet wheel 106 for relative rotation about the axis 103.

Figure 8:
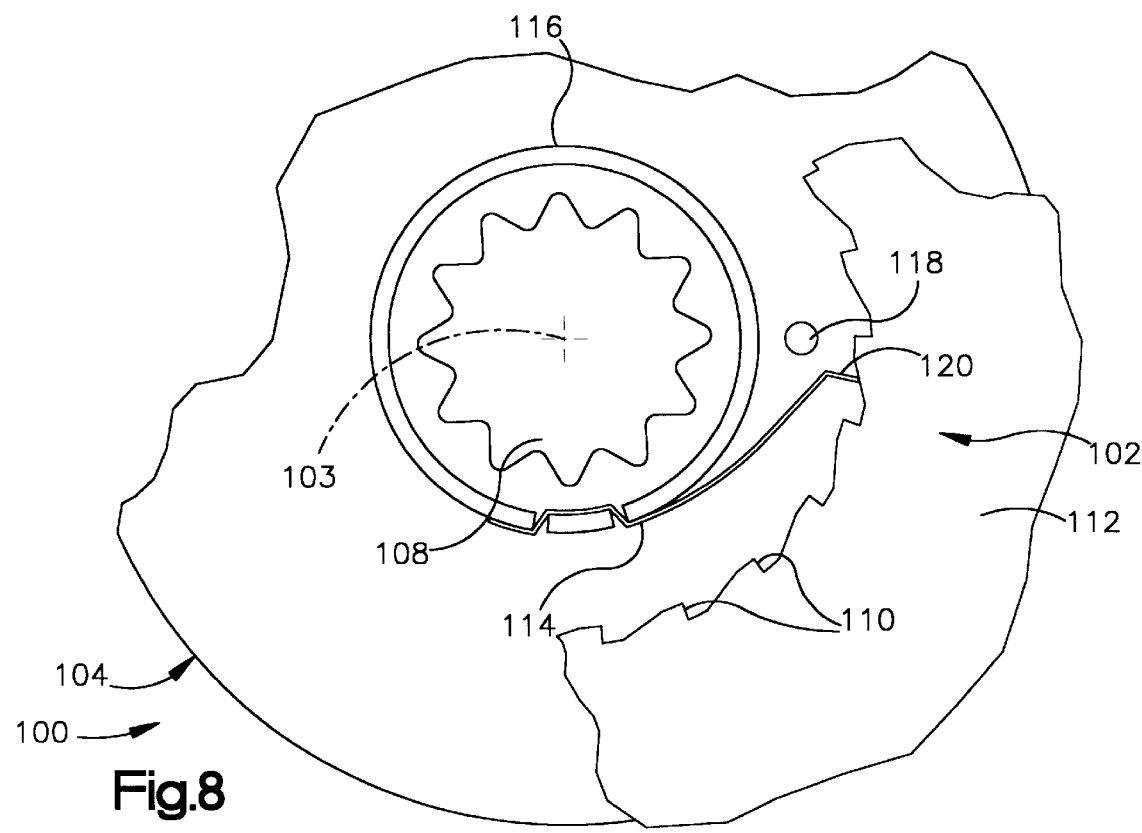
FIG. 8 is a view similar to FIG. 7 showing parts in different positions.

The alarm apparatus 102 has a plurality of first noise-maker parts 110 in the form of saw-tooth structures on a corresponding retractor frame 112. As shown in FIGS. 6–8, the saw-tooth structures 110 are arranged in a circumferentially extending row which reaches at least partially (and preferably entirely) around the axis 103. The alarm apparatus 102 further has a second noisemaker part 114 in the form of a leaf spring which is mounted on a stub shaft portion 116 of the spool 104. A holder rod 118 on the spool 104 engages the leaf spring 114 so as to hold the leaf spring 114 in an unactuated position, as shown in FIGS. 6 and 7, against a bias of the leaf spring 114. When the leaf spring 114 is in the unactuated position, a free end portion 120 of the leaf spring 114 is spaced radially inward from the saw-tooth structures 110.

The holder rod 118 extends longitudinally through the spool 104 from the leaf spring 114 to a ramp 122 (FIG. 6) on the ratchet wheel 106. A core portion 124 of the spool 104 defines a counterbore 126 containing a coil spring 128. The coil spring 128 acts against a diametrically enlarged portion 130 of the holder rod 118, and urges the holder rod 118 to move longitudinally outward of the counterbore 126 toward the ratchet wheel 106.

When the torsion bar 108 twists upon rotation of the spool 104 relative to the ratchet wheel 106, the holder rod 118 moves with the spool 104 around the axis 103 relative to the ratchet wheel 106. The holder rod 118 then slides down the ramp 122 under the influence of the coil spring 128, and thus moves longitudinally (from left to right as viewed in FIG. 6) out of engagement with the leaf spring 114. This releases the leaf spring 114 to flex radially outward to an actuated position (FIG. 8) in which its free end portion 120 strikes the saw-tooth structures 110 audibly in succession upon subsequent rotation of the spool 104.

In a third embodiment of the present invention, a pivotal blocking arm 140 (FIGS. 9 and 10) replaces the ramp 122 of FIG. 6. The blocking arm 140 is mounted on a ratchet wheel 142, and is located within a circumferentially extending groove 144 in the ratchet wheel 142. A stub shaft 146 on the blocking arm 140 projects into a pocket 148 in the ratchet wheel 142. The stub shaft 146 supports the blocking arm 140 for pivotal movement about an axis 149 relative to the ratchet wheel 142. A shear pin 150 on the blocking arm projects into a corresponding pocket 152 in the ratchet wheel 142, and normally prevents the blocking arm 140 from moving pivotally about the axis 149.

As shown schematically in FIG. 9, a holder rod 154 on a spool 156 is urged longitudinally against the blocking arm 140 under the influence of a coil spring 158. This occurs in substantially the same manner as described above with reference to the holder rod 118, the spool 104, and the coil spring 128 in the second embodiment of the present invention. A ring-shaped structure 160 on the spool 156 projects axially into the groove 144 in the ratchet wheel 140. As best shown in FIG. 10, the ring-shaped structure 160 does not extend entirely around the spool 156, but instead has a pair of opposite end surfaces 162 and 164 located on circumferentially opposite sides of the blocking arm 140.

When the spool 156 rotates relative to the ratchet wheel 142 against the resistance of a corresponding torsion bar (not shown), the ring-shaped structure 160 and the holder rod 154 move with the spool relative to the ratchet wheel 142 in a direction indicated by the arrow shown in FIG. 10. The first end surface 162 of the ring-shaped structure 160 then moves forcefully against the blocking arm 140 so as to sever the shear pin 150. When the spool 156 has rotated relative to the ratchet wheel 142 a predetermined amount corresponding to a predetermined amount of twisting of the torsion bar, the ring-shaped structure 160 will have moved against the blocking arm 140 sufficiently to pivot the blocking arm 140 fully into a radially recessed portion 166 of the groove 144, as shown in dashed lines in FIG. 10. The holder rod 154, which has then moved relative to the ratchet wheel 142 to the position shown in dashed lines in FIG. 10, is then free to move longitudinally into the groove 144 under the influence of the coil spring 158. The holder rod 154 is thus moved longitudinally out of engagement with a leaf spring (not shown) like the leaf spring 114 of FIG. 6.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a rotatable structure having an axis of rotation, said rotatable structure including a spool, a ratchet wheel, and a deflectable part which deflects upon rotation of said spool about said axis relative to said ratchet wheel; and an alarm apparatus which responds to deflection of said deflectable part by providing an audible alarm upon subsequent rotation of said rotatable structure;

said alarm apparatus having a plurality of first noisemaker parts in an array extending circumferentially relative to said axis, and further having a second noisemaker part which strikes said first noisemaker parts audibly in succession upon said subsequent rotation of said rotatable structure;

said second noisemaker part being supported for movement from an unactuated position spaced axially from said first noisemaker parts to an actuated position not spaced axially from said first noisemaker parts.

2. Apparatus as defined in claim 1 wherein said rotatable structure has a screw thread engaged with a screw thread on a driven part of said alarm apparatus so as to impart axial movement to said driven part upon deflection of said deflectable part, said driven part engaging said second noisemaker part so as to move said second noisemaker part to said actuated position upon a predetermined amount of said deflection.

3. Apparatus as defined in claim 2 wherein said second noisemaker part is a pin extending through a passage in said ratchet wheel.

4. Apparatus as defined in claim 3 wherein said deflectable part is a torsion bar.

5. Apparatus comprising:
  a rotatable structure having an axis of rotation, said rotatable structure including a spool, a ratchet wheel, and a deflectable part which deflects upon rotation of said spool about said axis relative to said ratchet wheel; and
  an alarm apparatus which responds to deflection of said deflectable part by providing an audible alarm upon subsequent rotation of said rotatable structure;
  said alarm apparatus having a plurality of first noisemaker parts in an array extending circumferentially relative to said axis, and further having a second noisemaker part which strikes said first noisemaker parts audibly in succession upon said subsequent rotation of said rotatable structure;
  said second noisemaker part being a leaf spring having a free end portion which strikes said first noisemaker parts upon said subsequent rotation of said rotatable structure;
  said leaf spring having an unactuated position in which said free end portion is spaced radially from said first noisemaker parts, said alarm apparatus further including a holder part which releasably engages and holds said leaf spring in said unactuated position against a bias of said leaf spring;
  said holder part being a rod extending longitudinally from said leaf spring to a ramp on said ratchet wheel, said rotatable structure supporting said rod to slide along said ramp and thereby to move longitudinally out of engagement with said leaf spring upon a predetermined amount of deflection of said deflectable part.

6. Apparatus as defined in claim 5 wherein said alarm apparatus further includes an additional spring which urges said rod against said ramp.

7. Apparatus comprising:
  a rotatable structure having an axis of rotation, said rotatable structure including a spool, a ratchet wheel, and a deflectable part which deflects upon rotation of said spool about said axis relative to said ratchet wheel; and
  an alarm apparatus which responds to deflection of said deflectable part by providing an audible alarm upon subsequent rotation of said rotatable structure;
  said alarm apparatus having a plurality of first noisemaker parts in an array extending circumferentially relative to said axis, and further having a second noisemaker part which strikes said first noisemaker parts audibly in succession upon said subsequent rotation of said rotatable structure;
  said second noisemaker part being a leaf spring having a free end portion which strikes said first noisemaker parts upon said subsequent rotation of said rotatable structure;
  said leaf spring having an unactuated position in which said free end portion is spaced radially from said first noisemaker parts, said alarm apparatus further including a holder part which releasably engages and holds said leaf spring in said unactuated position against a bias of said leaf spring;
  said holder part being a rod extending longitudinally from said leaf spring to a blocking arm on said rotatable structure, said rotatable structure supporting said blocking arm for movement pivotally out of engagement with said rod upon a predetermined amount of deflection of said deflectable part.

8. Apparatus as defined in claim 7 wherein said alarm apparatus further includes an additional spring which urges said rod against said blocking arm.

* * * * *